United States Patent [19]

Seale et al.

[11] 3,928,442

[45] Dec. 23, 1975

[54] METHOD OF PRODUCING ACRYLAMIDE WITH A NITROGEN BASE ACTIVATED COPPER CATALYST

[75] Inventors: Virgil L. Seale, Houston, Tex.; Ronald J. Allain, Brookhaven, Miss.

[73] Assignee: Nalco Chemical Company, Chicago, Ill.

[22] Filed: Aug. 26, 1974

[21] Appl. No.: 500,600

[52] U.S. Cl. ......... 260/561 N; 252/476; 252/477 Q; 260/557 R; 260/558 R
[51] Int. Cl.² ....................................... C07C 103/08
[58] Field of Search ......... 260/557 R, 558 R:561 R; 252/463, 476, 477 Q

[56] References Cited
UNITED STATES PATENTS

| | | | |
|---|---|---|---|
| 3,767,706 | 10/1973 | Habermann et al. | 260/561 N |
| 3,809,658 | 5/1974 | Csuros et al. | 252/477 Q |

FOREIGN PATENTS OR APPLICATIONS

| | | | |
|---|---|---|---|
| 44-8987 | 4/1969 | Japan | |
| 44-8988 | 4/1969 | Japan | 252/477 Q |
| 44-9458 | 5/1969 | Japan | 252/477 Q |
| 2,240,783 | 2/1973 | Germany | |

*Primary Examiner*—C. Davis
*Attorney, Agent, or Firm*—Hill, Gross, Simpson, Van Santen, Steadman, Chiara & Simpson

[57] ABSTRACT

An improved process for making acrylamide from a starting composition of acrylonitrile and water utilizing a copper catalyst which contains from about 2 to 45 weight percent aluminum on a 100 weight percent total weight basis. This catalyst is prepared by contacting a particulated copper/aluminum alloy with an aqueous solution of an organic nitrogen base. The hydrolysis process in which the catalyst is used can be practiced continuously for extended periods of time at high reaction rates with high conversion yields even when employing concentrated acrylonitrile starting feeds.

11 Claims, No Drawings

METHOD OF PRODUCING ACRYLAMIDE WITH A NITROGEN BASE ACTIVATED COPPER CATALYST

BACKGROUND OF THE INVENTION

In the art of catalytically hydrolyzing acrylonitrile with water to acrylamide, various copper and copper containing catalysts have been proposed, such as mixtures of copper oxide with other metal oxides, reduced copper oxides/metal oxide mixtures, copper and copper/metal mixtures, Raney copper, and the like (see, for example, U.S. Pat. Nos. 3,597,481; 3,631,104; 3,642,894; and 3,642,643; 3,767,706; German Patent No. 2,036,126; German DOS 2,164,185 (1972); Canadian Patent 899,380; and Japanese Patent Publication 69/5205.)

So far as can be determined, when using, for example, a Raney copper catalyst to hydrolyze acrylonitrile to acrylamide by the teachings of the prior art, it has been the practice to prepare or activate such catalyst by contacting such in a particulated form with aqueous alkali metal hydroxide to dissolve away at least a portion of the aluminum. Copper catalysts so prepared apparently can contain as a surface contaminant quantities of water insoluble aluminates. Apparently, these aluminates when present in or on a copper catalyst adversely affect catalyst activity.

So far as is known, no one has heretofore used for such a nitrile hydrolysis a copper catalyst which has been at least partially activated using a nitrogen base. Even catalysts so activated do not appear to have been known to the prior art.

BRIEF SUMMARY OF THE INVENTION

The present invention is directed to an improved process for making acrylamide from a starting composition comprising acrylonitrile and water by catalytic hydrolysis. Typically, such a starting composition comprises from about 10 to 75 weight percent acrylonitrile with the remainder to 100 weight percent thereof being water. Preferably, such composition contains from about 30 to 40 weight percent acrylonitrile (same basis). The process is conducted under aqueous liquid phase conditions using temperatures in the range of from about 60° to 150° C, with temperatures of from about 70° to 125° C being presently preferred.

The process involves contacting such a composition with a copper catalyst which has been activated at least in part with an aqueous solution of a nitrogen base (e.g. ammonium hydroxide, alkyl or alkanol amine, and quaternary ammonium hydroxide). No alkali metal hydroxide need be present during such activation. This catalyst as activated comprises from about 2 to 45 weight percent aluminum with the balance up to 100 weight percent thereof being copper. More preferably, such catalyst comprises, on a 100 weight percent total weight basis, from about 10 to 35 weight percent aluminum with the balance up to 100 weight percent thereof being copper. This catalyst is in the form of particles whose average diameters typically range from about 0.002 to 0.5 inch. In one aspect, this invention can be considered to include this catalyst as such.

Because of the characteristically long life associated with such a catalyst used in the practice of the process of the present invention wherein acrylonitrile is catalytically hydrolyzed with water to acrylamide, as indicated above, the present invention provides an improved catalytic hydrolysis process which can be operated continuously and for extended periods of time with the same catalyst to produce desired, economically significant, high conversion yields of acrylamide from acrylonitrile at economically significant high rates of conversion. A particularly preferred form of the invention utilizes such a catalyst which has a high or maximized initial catalytic activity. The invention is particularly useful, and the foregoing advantages are particularly well demonstrated, when using starting compositions containing a high, or concentrated, acrylonitrile content.

In addition, the process of this invention offers operating efficiencies and economies, particularly in fixed bed catalytic processes. The process of this invention also allows continuous operations which can be conducted for surprisingly long periods of time.

The present invention further provides an improved technique for activating a copper catalyst for use in a process for hydrolizing acrylonitrile to acrylamide under aqueous liquid phase conditions.

Further, the present invention aims to provide an amine base activated copper catalyst which is adapted to permit one to hydrolize acrylonitrile to acrylamide substantially free of by-product formation. Such catalyst characteristically displays a relatively high initial activity together with a relatively long catalyst life in such hydrolysis process.

Other and further aims, objects, purposes, advantages, utilities and features will be apparent to those skilled in the art from a reading of the present specification.

DETAILED DESCRIPTION

The catalyst used in the practice of the present invention is a copper catalyst which has been activated with a water-soluble nitrogen base, as indicated. The starting material for this catalyst is preferably a binary metal alloy compound of copper and aluminum which contains a weight ratio of aluminum to copper in the range from about 70:30 to 30:70 (preferably from about 45:55 to 55:45, and most preferably about 50:50). Minor amounts of other materials, such as metals or oxygen, may be present in a starting alloy. The alloy particles further initially have average particle diameters in the range of from about 0.002 to 0.5 inch.

The catalyst is, in general, preparable by contacting such a group of copper/aluminum alloy particles with a liquid aqueous medium containing dissolved therein organic nitrogen base. Preferred organic nitrogen bases are water soluble and are selected from the group consisting of ammonia (or ammonium hydroxide in water solution), alkyl amines, alkanol amines, quaternary ammonium compounds, and mixtures and derivatives thereof. More preferred organic amine bases used in a contacting operation in accord with the teachings of this invention comprise at least one compound selected from the group consisting of tri (lower alkyl) amines, tri (lower alkanol) amines, mono (lower alkyl) di (lower alkanol) amines, di (lower alkyl) mono (lower alkanol) amines, tetra (lower alkyl) quaternary ammonium hydroxides, tetra (lower alkanol) quaternary ammonium hydroxides, mono (lower alkyl) tri (lower alkanol) quaternary ammonium hydroxides, di (lower alkyl) di (lower alkanol) quaternary ammonium hydroxides, and tri (lower alkyl) mono (lower alkanol) quaternary ammonium hydroxides. The term "lower" as used herein has reference to less than 6 carbon atoms per group or molecule, as the case may be.

A suitable class of quaternary ammonium hydroxide compounds for use in the present invention is characterized by the following general formula:

(1) 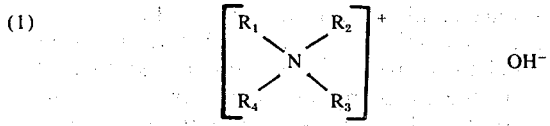

wherein $R_1$, $R_2$, $R_3$, and $R_4$ are each a lower alkyl radical or a lower hydroxyalkyl radical.

Examples of suitable primary amines include methylamine, ethylamine, ethanolamine, and the like. Examples of suitable secondary amines include diethylamine, dimethylamine, diethanolamine, methyl ethyl amine, methyl ethanol amine, and the like. Examples of suitable tertiary amines include trimethylamine, triethylamine, triethanolamine, monomethyl diethylamine, dimethyl monoethanolamine, and the like. Examples of suitable quaternary ammonium compounds include tetra methyl ammonium hydroxide, tetraethyl ammonium hydroxide, methyl triethyl ammonium hydroxide, trimethyl monoethyl ammonium hydroxide, methyl ethyl n-propyl n-butyl ammonium hydroxide, mono methanol tri ethyl ammonium hydroxide, tetramethanol ammonium hydroxide, tetra ethanol ammonium hydroxide, and the like. Various condensates of ethylene oxide, propylene oxide and/or butylene oxide with primary, secondary and tertiary amines can be employed. In general, commercially available materials are preferred for reasons of availability and cost. Mixtures of amine bases may be employed, such as a mixture of from about 25:75 to 75:25 weight ratio of tertiary (lower alkyl) amine with tetra (lower alkyl) ammonium hydroxide.

Further examples of monoamines include alphanaphthylamine, beta-naphthylamine, m-anisidine, o-toluidine, o-anisidine, aniline, N-methyl-o-toluidine, m-toluidine, N-methylaniline, N-methyl-m-toluidine, p-toluidine, pyridine, N-dimethylaniline, p-anisidine, N-methyl-p-toluidine, beta-picolene, N-dimethyl-o-toluidine, alpha-picolene, gamma-picolene, triethanolamine, morpholene, diethanolamine, 2-methoxy ethylamine, ethanolamine, benzylamine, 1-propyl piperidine, 1-2 dimethyl piperidine, 1-ethyl piperidine, isobutyl amine, 1-butyl piperidine, propylamine, isoamylamine, n-butyl amine, iso-propylamine, cyclohexylamine, methylamine, ethylamine, triethylamine, dimethylamine, diethylamine and piperidine.

Further examples of diamines include penta methylene diamine, tetra methylene diamine, trimethylene diamine, ethyl ethylene diamine, N-N'diethyl ethylene diamine, methyl ethylene diamine, N-N'dimethyl ethylene diamine, ethylene diamine, N-N diethyl ethylene diamine, hydroxyethyl ethylene diamine, piperazine, 1-2 diamino propane, 1-2 diamino propane, 1-3 diamino 2-propanol and N-N dimethyl ethylene diamine.

Those skilled in the art will appreciate that a catalyst prepared as taught herein may undergo further preparation by procedures known to the prior art as desired before being utilized in a hydrolysis process as taught herein. Thus, for example, during or after a contacting operation with organic nitrogen base in accordance with the teachings of this invention, the particles may be further brought into contact with water having dissolved therein an additive. In general, additives suitable for use in the preparation of a catalyst as taught by the present invention are hydroxylated hydrocarbon compounds, characterized by having at least two carbon atoms per molecule and by having at least two groups per molecule each of which is independently selected from the class consisting of hydroxyl, carboxyl, aldehyde, alkali metal carboxylate, and esterified carboxylate, at least one of said groups being hydroxyl. Preferably, such a hydroxylated hydrocarbon compound has at least three carbon atoms per molecule, and at least three groups per molecule each of which is independently selected from the class consisting of hydroxyl, carboxyl, aldehyde, alkali metal carboxylate and esterified carboxylate, at least one of said groups being hydroxyl.

The amount of such additive dissolved in water and contacted with particles can range widely, but, in general, quantities of from greater than 0 to 30 weight percent (total solution basis) are employed. The time of contacting with such an additive can vary widely and is apparently not critical, although catalyst activity is enhanced apparently through contact with such an additive solution preferably during the contacting with organic nitrogen base. Quantities of from 0.01 to 5 weight percent are preferred although larger amounts of a material such as ethylene glycol may be employed.

After being contacted with such an aqueous solution of additive, the resulting particles may, if desired, be finally washed with water to a pH in the range indicated, following which the particles may be stored as above indicated.

One preferred group of hydroxylated hydrocarbon compounds suitable for use in the present invention comprises polyhydroxylated aliphatic carboxylic acids. One class of such acids suitable for use in the present invention is characterized by the formula:

(1) 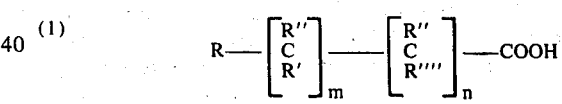

where:
R, R', R'', R''' and R'''' are each independently H, lower alkyl, —OH, or —COOH provided that at least one of R, R', R'', R''' and R'''' is hydroxyl and that at least one other of such R, R', R'', R''' and R'''' groups is either carboxyl or hydroxyl, $n$ is an integer of from 2 through 8 (4 through 8 being preferred), $m$ is an integer of from 0 through 4.

It will be readily appreciated by those skilled in the art that one can employ, in place of, or in addition to, those compounds of formula (1), carboxylate salts (such as alkali metal salts and ammonium salts) and carboxylate esters (such as lactones and esters with lower aliphatic alchols) which will, in alkaline water solution, form the same anions as do the compounds of formula (1).

Examples of particular compounds within the scope of formula (1) include: gluconic acid, glucaric acid, saccharinic acid, and the like.

One more preferred class of hydroxylated hydrocarbon compounds within the scope of formula (1) above is characterized by the formula:

(2) R—(CHOH)$_n$—COOH where:

R is selected from the group consisting of —CH$_3$, —CH$_2$OH, —COOH, —CHO, and —H, and n is an integer of from 1 through 5.

Examples of particular compounds within the scope of formula (2) include gluconic acid, glucaric acid, tartaric acid, d-glucuronic acid, and the like.

Examples of compounds suitable for use as additives during contacting in accord with the teachings of this invention which are similar to compounds within the scope of formula (1) or for formula (2) include alkali metal salts (sodium being presently preferred) of gluconic acid, tartaric acid, or citric acid, lactones, such as glucono-S-lactone, and the like.

Another class of hydroxylated hydrocarbon compounds includes aliphatic polyhydroxylated compounds with at least three carbon atoms and at least three hydroxyl groups per molecule. Such compounds can include as many as 12 to 15 carbon atoms in a given molecule. Examples include pentaerythritol, glycerol, and the like.

A more preferred class of such polyhdyroxylated hydrocarbon compounds suitable for use with caustic in activating Raney copper catalysts for use in the practice of the present invention is characterized by the formula:

(3) H—(CHOH)$_n$ — CH$_2$OH where n is an integer of from 3 through 8.

Examples of formula (3) compounds include sorbitol, mannitol, and the like.

Another class of hydroxylated hydrocarbon compounds suitable for use in the practice of the present invention for activating Raney copper catalysts with caustic includes saccharides (including mono, di, and polysaccharides). Examples include glucose, sucrose, corn starch, arabinose, and the like.

One preferred class of hydroxylated hydrocarbon compounds comprises aromatic compounds containing at least two hydroxyl groups (preferably ring bonded) and one aromatic ring. A carboxyl or aldehyde group may be present. One preferred example is gallic acid.

Preferred hydroxylated hydrocarbon compounds are substantially completely water soluble at the concentrations employed in the usual practice of this invention.

Presently most preferred hydroxylated hydrocarbon compounds include gluconic acid (and compounds which produce the gluconate ion in water solution, such as sodium gluconate, glucono-S-lactone, and the like) sorbitol, and glucose (dextrose). A presently most preferred alkali metal hydroxide is sodium hydroxide.

In the practice of this invention, a catalyst is prepared by contacting a prechosen starting group of copper/aluminum alloy particles with a liquid aqueous medium containing dissolved therein from greater than 0 to about 50 weight percent of organic nitrogen base for a time sufficient to remove at least about 1 weight percent of the total starting aluminum content of said group of alloy particles (total starting alloy particle weight basis).

Preferably, the starting group of copper/aluminum alloy particles ranges in size from about 0.001 to 0.5 inch. Preferably such particles have not previously been activated with the base for use in catalysis, and preferably such particles have preferably had substantially no previous history of exposure to oxygen.

Preferably, alloy particles being so contacted in accord with the present invention are maintained under water (e.g., in contact with water) before such contacting so as to minimize exposure to air (oxygen). Preferably, all waters used in the practice of this invention are either distilled water or deionized water, especially the waters used for particle storage before or after a contacting operation in accord with this invention.

The temperature in the reaction zone during the time of the contacting of alloy particles with solution of organic amine base can range very widely, being broadly in the range of from about 0° to 100°C. When the copper/aluminum alloy particles come into contact with a solution of an amine base, a reaction occurs, and hydrogen is evolved, as aluminum in the alloy reacts with the nitrogen base. The reaction rate is dependent upon many variables, such as nitrogen base type and concentration, temperature, pressure, alloy particle size and composition, and the like, as those skilled in the art will appreciate.

Typically, one can employ during catalyst activation using an organic nitrogen base in accordance with this invention a total quantity of organic amine base such that the molar quantity of nitrogen base used during activation totals from about 0.25 to 2.0 times (preferably about 1.1 to 2.0 times) the total molar amount of aluminum initially present in a starting group of alloy particles, as when a batch preparation procedure is being employed, where the aqueous nitrogen base is being added to a vessel containing a fixed quantity of starting alloy particles and the aqueous nitrogen base composition is allowed to accumulate in the vessel during the activation operation.

The amount of hydrogen gas evolved during an activation or a contacting in accordance with this invention is not always related to, or correlated with, the amount of organic nitrogen base actually used. Conveniently, the hydrogen gas produced is vented more or less at the rate generated from the reaction zone. It is preferred to conduct the activation operation under inert conditions, such as under a blanket of nitrogen gas or a gas of the helium family primarily to avoid forming explosive mixtures of hydrogen and oxygen.

At the end of a contacting operation in accord with the teachings of this invention, the resulting particles remaining are preferably washed with water to a neutral pH (e.g. a pH in the range of from about 7.0 to 8.0). The product catalyst is then removed from the reaction zone and wet screened, preferably, to separate fines.

The product catalyst is conveniently stored under water, as in drums, prior to charging to a reactor for use in the practice of the process of the invention. Keeping the catalyst under water prevents oxidation by air which occurs rapidly if the catalyst is allowed to have oxygen exposure.

Preferably, contacting with organic nitrogen base in accord with this invention is carried out at temperatures below about 60°C and above 0°C.

In treating the alloy particles with the organic nitrogen base, it is important that the heat of the activation reaction be controlled. For some unexplained reason, when the particles are overheated or are exposed to localized zones of extremely high temperatures, the finished catalyst is inferior and has a relatively short life. The reaction evolves hydrogen which may be monitored so that the rate of the reaction may be followed.

Thus, in a preferred mode of operating, the contacting between alloy particles and solution of nitrogen base is carried out while maintaining a reaction rate between particles and nitrogen base in aqueous reaction medium such that less than about 0.02 (and preferably less than about 0.01) moles of hydrogen per mole of aluminum initially present in the alloy particles on a 100 weight percent total initial alloy basis is evolved per minute. The contacting is conducted while keeping the bulk temperature and such medium in the region of the group of alloy particles in the range of from about 0 to 82°C and this contacting is continued until at least about 25 weight percent of the aluminum initially present in the alloy on a 100 weight percent total initial alloy basis is removed. The total number of moles of organic nitrogen base charged to the aqueous contacting medium during the total time of the contacting is at least about 0.5 times the number of moles of aluminum initially present in the alloy particles. The total weight of water initially present in the medium at the beginning of the contacting plus water added to the reaction zone during the contacting ranges from about 100 to 1.5 times the total weight of the organic nitrogen base charged to the aqueous contacting medium. Preferably, addition or organic nitrogen base is accomplished to the aqueous contacting medium through long addition timewise of any organic nitrogen base, such as over the period of contacting.

In general, the time of contacting between organic nitrogen base aqueous solution and particles can range very widely, times of from about one-half to 30 hours being presently convenient and preferred, though longer and shorter contacting times may be employed if desired.

The hydrolysis of this invention proceeds even when the amount of the catalyst produced as herein taught employed is very slight. For example, addition of a catalyst as taught by this invention in an amount of as small as 0.01 gram per mol of acrylonitrile is sufficient to make the reaction proceed. The greater the amount of catalyst used, the faster the reaction proceeds, in general, thus permitting in increase in the amount of acrylamide produced. Consequently, the amount of catalyst produced per mole of acrylonitrile initially employed can preferably range from about 0.01 to 100 grams, though more or less catalyst can be used if desired.

Acrylamide may be made from a mixture of acrylonitrile and water in accordance with the teachings of the present invention using a suspension bed or a fixed bed of such catalyst. Combinations thereof may be employed. Two or more reactors may be connected in series and the reactant liquid and the catalyst may be countercurrently moved relative to each other to effect and enhance reaction. The hydrolysis process may be practiced under atmospheric conditions, which are preferred, but superatmospheric and subatmospheric pressures may be employed. Batch processing may be used, but continuous is preferred.

When practicing the hydrolysis process of the present invention using a copper catalyst prepared as described herein and utilizing a suspension bed system, it is preferred to employ the catalyst in the form of particles at least 90 weight percent of which are in an average size range of from about 0.002 to 1.0 inch. Similarly, when the present invention is practiced using a Raney copper catalyst in the form of a fixed bed system, it is convenient and preferred to use the catalyst in the form of particles at least 90 weight percent of which range in average size from about 0.02 to 0.50 inch.

Examples of polyamines include diethylene triamine, 1-2-3 triamino propane and triethylene tetramine.

EMBODIMENTS

The present invention is further illustrated by reference to the following Examples. Those skilled in the art will appreciate that other and further embodiments are obvious and within the spirit and scope of this invention from the teachings of these present Examples taken with the accompanying specification.

EXAMPLE 1

84 grams of 50:50 weight ratio copper/aluminum alloy in the form of particles of 6 to 8 mesh size are contacted with 500 grams total of a 25 weight percent aqueous solutin of trimethylamine in deionized water over a 48-hour period in a flask. The particles are initially covered by deionized water (about 500 ml). The trimethylamine solution is introduced into the flask gradually at a rate such that the temperature of the agitated liquid reaction medium does not exceed about 40°C. Hydrogen gas is evolved.

The resulting particles are washed with fresh deionized water until the resulting pH is 7.5.

EXAMPLE 2

The procedure of Example 1 is repeated except that here the particles are initially covered by deionized water containing dissolved therein about 0.1 weight percent gluconic acid which water remains in the flask throughout the contacting procedure with trimethylamine.

EXAMPLE 3

The procedure of Example 2 is repeated except that here sorbitol is used in place of gluconic acid at the same concentration.

EXAMPLE 4

84 grams of 50:50 weight ratio copper/aluminum alloy in the form of particles of 6 to 8 mesh size are contacted with 1200 grams of a 15 weight percent aqueous solution of tetramethyl ammonium hydroxide in deionized water over a 24-hour period. The particles are initially covered with deionized water. The tetramethyl ammonium hydroxide is introduced into the flask gradually at a rate such that the temperature of the agitated liquid reaction medium does not exceed about 35°C. Initially, it was necessary to cool the system as evolution of hydrogen gas was quite vigorous.

The resulting particles (catalyst) are washed with fresh deionized water.

The particles are analyzed and found to comprise 53 weight percent copper and 31 weight percent aluminum. Presumably, the balance up to 100 weight percent is mostly oxygen.

EXAMPLE 5

The procedure of Example 4 is repeated except that here the particles are initially covered by deionized water containing dissolved therein about 0.1 weight percent gluconic acid which water remains in the flask throughout the contacting procedure with trimethylamine.

EXAMPLE 6

The procedure of Example 5 is repeated except that here sorbitol is used in place of gluconic acid at the same concentration.

EXAMPLE 7

The procedure of Example 5 is repeated except that here dextrose monohydrate is used in place of gluconic acid at the same concentration.

EXAMPLE 8

Choline Preparation

To a two-liter autoclave is charged 944 grams of a 25 weight percent solution of trimethylamine in deionized water. To this system under autogeneous pressure is charged gradually with a stoichiometric quantity of ethylene oxide below the water level in the vessel at such a rate that the temperature of the liquid phase of the reactants in the vessel is maintained at less than about 40°C. During the exothermic reaction, thereafter, after 1 hour of agitation, the resulting solution of choline so prepared is removed from the autoclave and placed in a storage flask.

This choline preparation is repeated until about 7500 grams of a 20 percent aqueous choline solution is prepared (with dilution by deionized water). This product solution contained minor amounts of ethylene glycol and trimethylamine. Most of this choline solution stood for approximately one week before being used in the following catalyst activation procedure.

Catalyst Activation

To 500 grams of 50:50 weight ratio copper-/aluminum alloy in the form of particles of 6 to 8 mesh size in about 8 grams of 50 weight percent gluconic acid solution in deionzed water are added 7500 grams of the above prepared choline solution. The choline was gradually added to the liquid phase reaction zone which was agitated at a rate generally insufficient to disturb the particles at the bottom of the reaction flask, the choline solution addition rate being such that the reaction zone temperature did not rise above about 35°C. During this addition, hydrogen gas was evolved which was vented to the atmosphere. The addition of choline solution was accomplished over an interval of from 2 ½ to 3 days. This solutin was added during daylight hours at about 30-minute intervals. In the afternoon of the third day after the solution addition was complete, the agitation was stopped, the reaction mixture allowed to settle, and the liquid reactants were decanted. The resulting (catalyst) particles were washed with fresh, deionzed water to a pH of about 7.5, after which they are stored under fresh deionized water.

EXAMPLE 9

The catalyst prepared as described in Example 1 and having a particle size of 6 to 8 mesh is charged to a stainless steel 2-liter autoclave with 880 grams of water and 420 grams of acrylonitrile. Sufficient catalyst is charged so as to provide about a 10 percent catalyst loading based on acrylonitrile, that is, about 42 grams of copper. The autoclave contents are heated to about 105°C and the contents are agitated. The time necesary to produce a one-phase reactant system from the initially two-phase starting system is noted. The system remains in two phases until about 65 percent conversion of acrylonitrile to acrylamide is achieved. In this instance, a one-phase system is achieved in about 5 ½ hours.

EXAMPLE 10

The procedure of Example 9 is repeated except that the catalyst of Example 2 is employed. The time required to produce a one-phase system is less than in Example 9.

EXAMPLE 11

The procedure of Example 9 is repeated except that the catalyst of Example 3 is employed. The time required to produce a one-phase system is less than Example 9.

EXAMPLE 12 (parts (a) through (d))

a. The procedure of Example 9 is repeated except that the catalyst of Example 4 is employed. In this run, high yields of cyanohydrin are obtained due to the fact that the catalyst contained residual OH$^-$ ions (in other words, the pH of the water containing the catalyst was too high).

b. The catalyst particles are washed with water to a pH of 7.5, and the procedure of Example 9 is repeated a second time using this catalyst. A one-phase reaction system is achieved in about 3/4 hours and a 90 percent conversion of acrylonitrile to acrylamide is achieved after about 3 hours.

c. The same catalyst after such second use is used a third time following again the procedure of Example 9. A one-phase reaction system is achieved in about 1 ¾ hours and a 90 percent conversion of acrylonitrile to acrylamide is achieved after about 5 hours.

d. This same catalyst after such third use is used a fourth time following once again the procedure of Example 9. A one-phase reaction system is achieved in about 2 hours and a 90 percent conversion of acrlonitrile to acrylamide is achieved after about 5 ½ hours.

EXAMPLE 13

The procedure of Example 9 is repeated except that the catalyst of Example 5 is employed. The time required to produce a one-phase system is less than in Example 12, part (b).

EXAMPLE 14

The procedure of Example 9 is repeated except that the catalyst of Example 6 is employed. The time required to produce a one-phase system is less than in Example 12, part (b).

EXAMPLE 15

The procedure of Example 9 is repeated except that the catalyst of Example 7 is employed. The time required to produce a one-phase system is less than in Example 12, part (b).

EXAMPLE 16

The catalyst prepared as described in Example 8 and having a particle size of 6 to 8 mesh is charged to a stainless steel pipe having an inside diameter of 1 ½ inches so as to produce in the pipe a fixed catalyst bed about 25 centimeters in length. The bed contact volume (or void volume) is 85 milliliters. The pipe is jacketed with three sections of electric heating coils and is mounted in a vertical configuration. Bottom and top ends of the pipe are fitted with hose connections and the assembly is appropriately instrumented so as to provide a continuous tubetype reactor.

Into the bottom of the column is continuously charged 94 grams of acrylonitrile per hour and, also, simultaneously 246 grams of deionized water per hour. The effluent from the top of the column is not recirculated. Jacket temperature is maintained at about 95° to 105°C. Immediately after steady state conditions are achieved, the percent conversion of acrylonitrile to acrylamide is determined by sampling the effluent and analyzing the actual percent acrylamide present in a gas chromatograph. The initial conversion is then calculated to be about 70.7 percent.

The column is then continuously operated for about 775 hours. About once every 24 hours, the effluent is sampled and the percent conversion of acrylonitrile to acrylamide is similarly measured by gas chromatograph. At the end of 775 hours, the percent conversion is found to be about 68 percent, the average conversion over the entire run is about 68.8 percent. A total of 269.7 pounds of acrylamide per pound of copper in the catalyst was produced.

EXAMPLE 17

The procedure of Example 9 is repeated except that the catalyst particle mixture of Example 16 is employed. The time required to produce a one-phase system is about one hour.

EXAMPLE 18

The procedure of Example 1 is repeated except that, in place of trimethylamine, monomethylamine is employed using a 72-hour contact period.

EXAMPLE 19

The procedure of Example 9 is repeated except that the catalyst particles of Example 18 are employed. The time required for production of a one-phase system is about 6 hours.

EXAMPLE 20

The procedure of Example 1 is repeated except that in place of trimethylamine a 10 weight percent ammonium hydroxide solution in deionized water is employed using a 72-hour contacting period.

EXAMPLE 21

The procedure of Example 9 is repeated except that the catalyst particles of Example 20 are employed. The time required for production of a one-phase system is about 6 hours.

EXAMPLE 22

The procedure of Example 1 is repeated except that a 50:50 mixture of trimethylamine and tetrmethyl ammonium hydroxide is used as a 25 weight percent solution in deionized water. When this product catalyst is used according to the procedure of Example 9, excellent catalyst activity is demonstrated.

EXAMPLE 23

The procedure of Example 2 is repeated except that the gluconic acid is replaced by gallic acid. When this product catalyst is used according to the procedure of Example 9, excellent catalyst activity is demonstrated.

EXAMPLE 24

To a 25 weight percent solution of trimethylamine is deionized water flowing in a tube is continuously charged first a stoichiometric quantity of ethylene oxide to produce choline and then sufficient additional water to dilute the resulting mixture to a (calculated) trimethylamine content of 4 weight percent.

This stream is then continuously charged to a column of 50:50 weight ratio copper/aluminum alloy as particles of 6 to 8 mesh. The column is about 1 ½ inches inside diameter and about 25 centimeters in length. Flow rate of the choline solution through the column is adjusted as necessary to maintain the column interior below about 30°C. The cholin solution is passed through the column for eight hours after which the column contents are washed with a 0.1 weight percent gluconic acid solution to a pH of 7.5.

The column of the resulting particles is used in place of the column described in Example 16 and the column is then used as taught in Example 16 for acrylonitrile hydrolysis to acrylamide. The intitial conversion after steady state conditions are achieved is calculated to be about 73 percent of acrylonitrile to acrylamide.

The claims are:

1. In the process wherein acrylonitrile is hydrolyzed with water in the presence of a copper catalyst, the improvement which comprises using as said catalyst a particulate copper catalyst which comprises from about 2 to 45 weight percent aluminum with the balance up to 100 weight percent thereof (total catalyst dry weight basis) being copper, said catalyst having been prepared by contacting a prechosen starting group of copper/aluminum alloy particles having an aluminum to copper ratio of from about 70:30 to 30:70 with a liquid aqueous medium containing dissolved therein from greater than 0 to about 50 weight percent of organic nitrogen base selected from the group consisting of ammonia, alkyl amines, alkanol amines, quaternary ammonium compounds, and mixtures thereof for a time sufficient to remove at least about 1 weight percent of the total starting aluminum content of said group of alloy particles (total starting alloy particle weight basis).

2. In a process wherein acrylonitrile is hydrolyzed with water in the presence of a copper catalyst, the improvement which comprises using as said catalyst a particulate copper catalyst which comprises from about 2 to 45 weight percent aluminum with the balance up to 100 weight percent thereof (total catalyst dry weight basis) being copper, said catalyst having been prepared by contacting a prechosen starting group of copper/aluminum alloy particles with a liquid aqueous medium containing dissolved therein from greater than 0 to about 50 weight percent of at least one compound selected from the group consisting of tri (lower alkyl) amines, tri (lower alkanol) amines, mono (lower alkyl) di (lower alkanol) amines, di (lower alkyl) mono (lower alkanol) amines, ammonium hydroxide, tetra (lower alkyl) quaternary ammonium hydroxide, tetra (lower alkanol) ammonium hydroxide, mono (lower alkyl) tri (lower alkanol) quaternary ammonium hydroxides, di (lower alkyl) di (lower alkanol) quaternary ammonium hydroxides and tri (lower alkyl) mono (lower alkanol) quaternary ammonium hydroxides for a time sufficient to remove at least about 1 weight percent of the total starting aluminum content of said group of alloy particles (total starting alloy particle weight basis).

3. The process of claim 2 wherein said compound is choline.

4. The process of claim 3 wherein said choline is produced in situ through addition to said medium of trimethyl amine and ethylene oxide.

5. The process of claim 2 wherein said compound is triethylamine.

6. The process of claim 2 wherein said compound comprises a mixture of said quaternary ammonium hydroxide and said trialkyl amine in the weight ratio of from about 25:75 to 75.25.

7. The process of claim 2 wherein said compound is produced in situ through addition to said medium of ethylene oxide and at least one amine selected from the group consisting of tri (lower alkyl) amines, tri (lower alkanol) amines, mono (lower alkyl) di (Lower alkanol) amines, and di (lower alkyl) mono (lower alkanol) amines.

8. The process of claim 1 wherein said contacting is conducted in the presence of a hydroxylated hydrocarbon compound, said hydrocarbon compound having at least two carbon atoms per molecule and having at least two groups per molecule, at least one of such groups being hydroxyl, the other of said groups being selected from the class consisting of hydroxyl, carboxyl, aldehyde, alkali metal carboxylate and esterified carboxylate.

9. The process of claim 7 wherein said contacting is conducted in the presence of a hydroxylated hydrocarbon compound, said hydrocarbon compound having at least two carbon atoms per molecule and having at least two groups per molecule at least one of such groups being hydroxyl, the other of said groups being selected from the class consisting of hydroxyl, carboxyl, aldehyde, alkali metal carboxylate and esterified carboxylate.

10. In an improved process for making a catalyst adapted for use in hydrolyzing acrylonitrile to acrylamide, the improvement which comprises contacting a metal alloy comprised of copper and aluminum in particular form with an aqueous liquid medium containing dissolved therein from greater than 0 to about 50 weight percent organic amine base and from greater than 0 to about 30 weight percent of at least one hydroxylated hydrocarbon compound characterized by having at least two carbon atoms per molecule and by having at least two groups per molecule, at least one of said groups being hydroxyl, the other of said groups being selected from the class consisting of hydroxyl, carboxyl, aldehyde, alkali metal carboxylate, and esterfied carboxylate.

11. The process of claim 10 wherein said organic amine base comprises at least one compound selected from the group consisting of tri (lower alkyl) amines, tri (lower alkanol) amines, mono (lower alkyl) di (lower alkanol) amines, di (lower alkyl) mono (lower alkanol) amines, ammonium hydroxide, tetra (lower alkyl) quaternary ammonium hydroxide, tetra (lower alkanol) quaternary ammonium hydroxide, mono (lower alkyl) tri (lower alkanol) quaternary ammonium hydroxides and tri (lower alkyl) mono (lower alkanol) quaternary ammonium hydroxides.

* * * * *